UNITED STATES PATENT OFFICE.

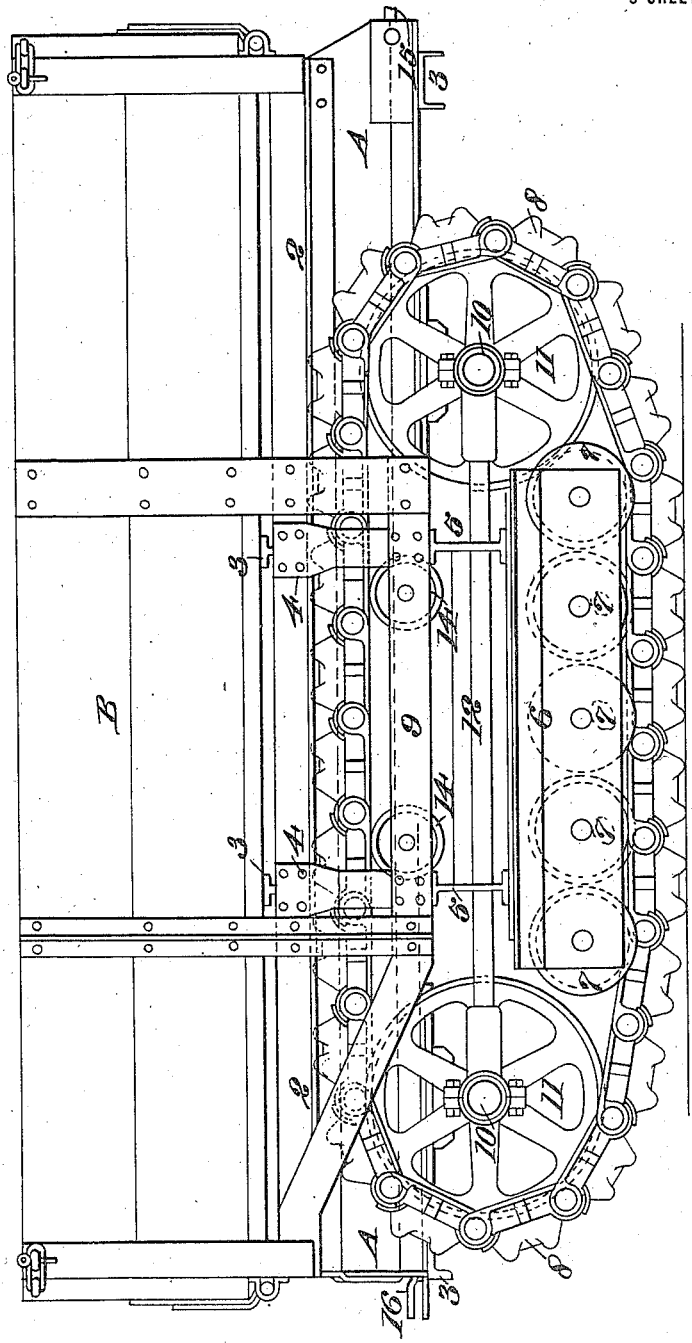

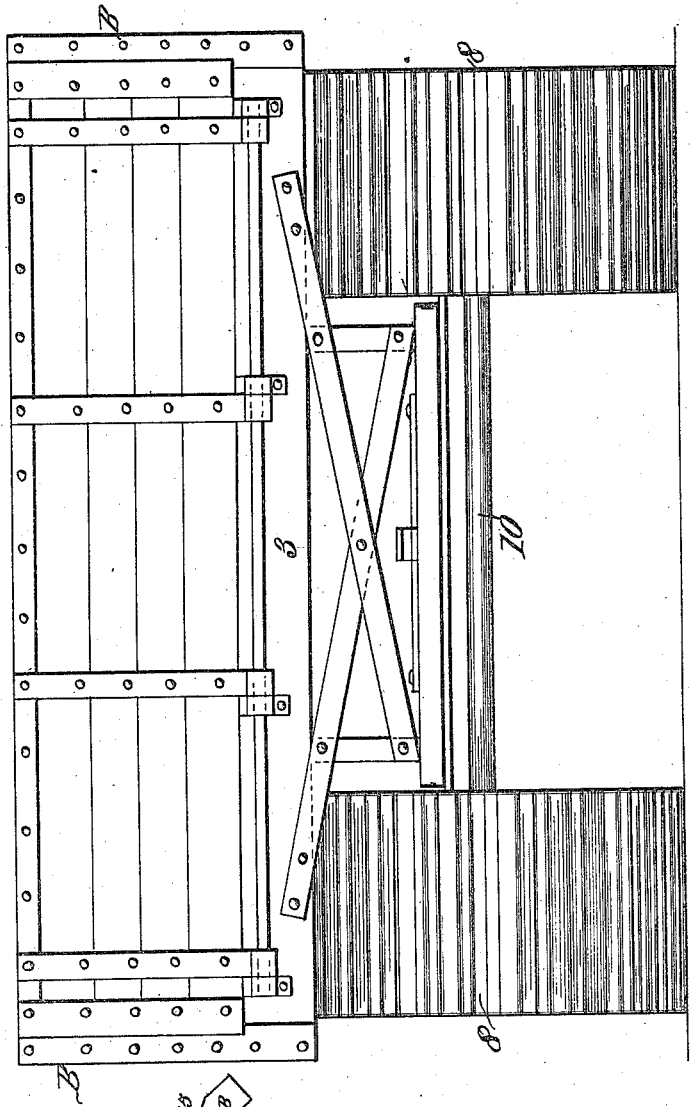

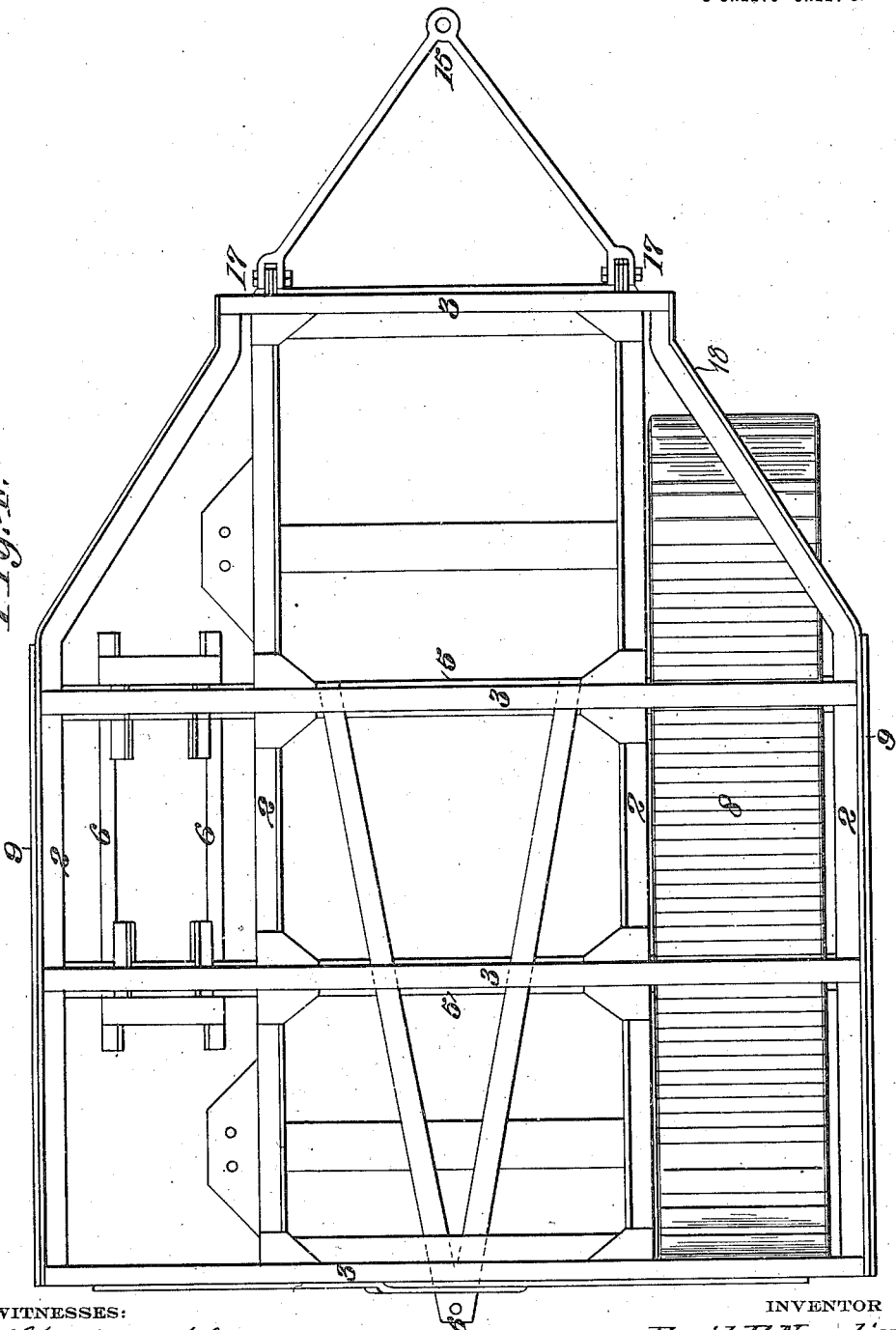

EMIL F. NORELIUS, OF PEORIA, ILLINOIS, ASSIGNOR TO THE HOLT MANUFACTURING COMPANY, OF STOCKTON, CALIFORNIA, A CORPORATION OF CALIFORNIA.

TRAILER-WAGON.

1,186,824.     Specification of Letters Patent.     Patented June 13, 1916.

Application filed January 27, 1915. Serial No. 4,666.

*To all whom it may concern:*

Be it known that I, EMIL F. NORELIUS, a citizen of the United States, residing at Peoria, in the county of Peoria and State of Illinois, have invented new and useful Improvements in Trailer-Wagons, of which the following is a specification.

This invention relates to vehicles of the self-laying track variety and pertains especially to a trailer wagon or haulage truck more particularly intended for use in connection with the transport of heavy loads and over bad roads or trackless country.

Having reference to the accompanying drawings: Figure 1 is a side elevation of the trailer. Fig. 2 is a rear elevation of same. Fig. 3 is a diagrammatic view showing the manner of operating the same. Fig. 4 is a plan view of the under frame construction.

The present invention consists, generally, in mounting a vehicle chassis composed of upper and lower frames preferably of metal girders suitably connected together, upon endless self-laying track belts, front and rear idlers for said track belts being secured upon shafts carried by the lower frame, and the upper frame being wider than the lower frame and carrying trucks which bear upon the ground run of the endless track belts; the entire weight of the vehicle being supported over a comparatively large area solely on the two self-laying track belts.

The lower frame consists of two longitudinal, parallel beams or sills A which are conveniently of I section and connected and braced across at intervals to form a rigid structure. The upper frame comprises a number of longitudinal members or sills 2 *e. g.* four, the central two being, for instance, I beams and the outer two of channel section. These members are connected together at their ends and intermediate of their length by suitable cross pieces 3 which may be of I or channel section; the pieces 3 resting upon and being secured to the sills A of the lower frame.

The upper frame at or about its central portion is provided on each side with dependent arms 4 or supports connected to cross members 5 of I section passing below the lower frame, and secured to and resting on the body of the trucks 6, the rollers 7 of which rest upon the ground-run of each endless track belt 8. These dependent arms 4 may be stayed or tied to one or both ends of the upper frame of the vehicle chassis by the stay rods or bars 9; these arms passing downward outside the endless tracks and the cross beams 5 passing through the track belts 8.

The lower frame carries brackets or bearings for the fixed axles 10 of the vehicle, and idlers 11 are mounted on each of these axles, said idlers engaging the respective endless tracks 8 on the inner side or passing between the rail sections provided upon the same for the rollers 7 of the trucks. The two axles are connected on each side by push-rods 12 having adjustable sleeves so that each track may be tensioned or adjusted when required.

The upper run of the track belts is supported on rollers 14 which are suitably mounted in the overhang extensions of the upper frame and the entire weight of the vehicle is supported on the two endless self-laying tracks 8.

In order to adapt the wagon for haulage purposes to be attached either to a traction engine or to any other trailer or form a unit of a train, there are provided suitable front and rear draw-bar connections or couplers 15—16; the front draw-bar 15 being V-shaped and preferably pivoted at 17 to the beams A; and the rear draw-bar 16 being preferably V-shaped and connected well forward beneath the upper frame and to the lower frame.

The endless track employed may be of any suitable construction; each track being free to move independently of the other and the longitudinal plane of each track being outside the lower frame and inside the upper frame of the wagon or vehicle.

A bed or body B of any suitable design or construction is mounted on the upper frame of the chassis and is of a width equal to the maximum width of the vehicle; that is the bed extends over the supporting tracks 8 so that the largest possible load may be carried in the smallest possible space. Thus one of these wagons as actually constructed and measuring approximately fourteen feet six inches in length and nine feet in width is capable of transporting a ten-ton load.

In order to permit these heavy wide cars to be coupled up close together in train, as shown diagrammatically in Fig. 3, the forward ends of the outer members 2 of the upper frame of the chassis are narrowed or inswept, as shown at 18, Fig. 4; the bed or body B rising in conformity with said inswept portions. The width of the forward end of the bed and chassis is thus made narrower than the width between the two endless flexible self-laying tracks; the rear end of the bed and chassis extending over said track.

Having thus described my invention, what I claim and desire to secure by Letters Patent is—

1. A trailer wagon of the self-laying track variety in which the entire vehicle is supported on two endless self-laying tracks, said wagon consisting of upper and lower frames composed of metal girders, the upper frame being wider than and supported upon the lower, the lower frame consisting of two parallel, longitudinal beams suitably connected to form a rigid structure, the lower frame having side projecting axles, idlers on said axles, truck frames between the axles and on which truck frames the lower frame rests, endless flexible traction belts passing around the idlers, rollers between the truck frames and belt and supporting the load on the ground run of the belt, and the upper frame extending over the track belts, the upper frame having dependent arms outside the track belts, cross member extensions on the lower frame which pass through the belts and connect with said arms, rollers on said cross member extensions to support the upper run of the belts, and stays connecting an end of the upper frame with said arms.

2. A trailer wagon of the self-laying track variety in which the entire vehicle is supported by the two endless self-laying tracks, said wagon consisting of upper and lower frames composed of metal girders, the upper frame being wider than and supported upon the lower, the lower frame consisting of two parallel longitudinal beams suitably connected to form a rigid structure, the lower frame having side projecting axles, idlers on said axles, endless flexible traction belts passing around the idlers, the upper frame extending over the track belts, and having dependent arms outside the track belts, cross member extensions on the lower frame which pass through the belts and connect with said arms, truck frames between the axles and mounted on said cross member extensions, said truck frames having rollers running on the ground run of the belts, and stays connecting an end of the upper frame with said dependent arms.

3. A wagon structure including, in combination, a lower frame having bearings for front and rear axles, front and rear idlers mounted on said axles, on either side of the lower frame, endless track belts supported respectively by the front and rear idlers, an upper frame supported upon the lower frame and extending clear over the track belts on each side of the lower frame, the upper frame having dependent arms outside the track belts connected with the lower frame, and trucks supported within the respective track belts and connected with the lower frame, said trucks having rollers running on the ground run of the track belts, whereby the entire load of the vehicle is supported upon the track belts by the trucks.

In testimony whereof I have hereunto set my hand in the presence of two subscribing witnesses.

EMIL F. NORELIUS.

Witnesses:
WILLIAM TURNBULL,
F. I. MEEKER.